(12) United States Patent
Halliday et al.

(10) Patent No.: US 9,307,412 B2
(45) Date of Patent: Apr. 5, 2016

(54) METHOD AND SYSTEM FOR EVALUATING SECURITY FOR AN INTERACTIVE SERVICE OPERATION BY A MOBILE DEVICE

(71) Applicant: LOOKOUT, INC., San Francisco, CA (US)

(72) Inventors: Derek Halliday, San Francisco, CA (US); Bruno Bergher, San Francisco, CA (US); Kevin Mahaffey, San Francisco, CA (US); Brian Buck, Livermore, CA (US); Abheek Gupta, Berkeley, CA (US)

(73) Assignee: LOOKOUT, INC., San Francisco, CA (US)

( * ) Notice: Subject to any disclaimer, the term of this patent is extended or adjusted under 35 U.S.C. 154(b) by 107 days.

(21) Appl. No.: 14/072,718

(22) Filed: Nov. 5, 2013

(65) Prior Publication Data

US 2014/0325586 A1 Oct. 30, 2014

Related U.S. Application Data

(63) Continuation-in-part of application No. 29/453,039, filed on Apr. 24, 2013, now Pat. No. Des. 728,602, and a continuation-in-part of application No. 29/453,040, filed on Apr. 24, 2013, now Pat. No. Des. 728,603, and (Continued)

(51) Int. Cl.
*G06F 17/00* (2006.01)
*H04L 29/06* (2006.01)
*H04W 12/12* (2009.01)

(52) U.S. Cl.
CPC ............. *H04W 12/12* (2013.01); *H04L 63/126* (2013.01); *H04L 63/1433* (2013.01); *H04L 63/1483* (2013.01)

(58) Field of Classification Search
CPC .............................. H04L 29/06; H04L 63/126
USPC .............................................................. 726/1
See application file for complete search history.

(56) References Cited

U.S. PATENT DOCUMENTS

| | | | |
|---|---|---|---|
| 5,715,518 | A | 2/1998 | Barrere et al. |
| 6,696,941 | B2 | 2/2004 | Baker |

(Continued)

FOREIGN PATENT DOCUMENTS

| | | |
|---|---|---|
| WO | 2010048218 | 4/2010 |
| WO | 2010048220 | 4/2010 |
| WO | 2012027588 | 1/2012 |

OTHER PUBLICATIONS

David M. Nicol; Model-Based Evaluation: From Dependability to Security; Year: 2006; IEEE; p. 1-173.*

(Continued)

*Primary Examiner* — Monjour Rahim
(74) *Attorney, Agent, or Firm* — Dergosits & Noah LLP

(57) ABSTRACT

A method for evaluating security during an interactive service operation by a mobile communications device includes launching, by a mobile communications device, an interactive service configured to access a server over a network during an interactive service operation, and generating a security evaluation based on a plurality of trust factors related to a current state of the mobile communications device, to a security feature of the application, and/or to a security feature of the network. When the security evaluation is generated, an action is performed based on the security evaluation.

26 Claims, 9 Drawing Sheets

Related U.S. Application Data a continuation-in-part of application No. 29/453,047, filed on Apr. 24, 2013, now Pat. No. Des. 727,943, and a continuation-in-part of application No. 29/453,048, filed on Apr. 24, 2013, now Pat. No. Des. 728,604.

(56) References Cited

U.S. PATENT DOCUMENTS

| | | |
|---|---|---|
| 6,892,225 B1 | 5/2005 | Tu et al. |
| 7,159,237 B2 | 1/2007 | Schneier et al. |
| 7,181,252 B2 | 2/2007 | Komsi |
| 7,304,570 B2 | 12/2007 | Thomas et al. |
| 7,346,605 B1 | 3/2008 | Hepworth |
| 7,493,403 B2 | 2/2009 | Shull |
| 7,761,583 B2 | 7/2010 | Shull |
| 7,783,281 B1 | 8/2010 | Cook et al. |
| 7,809,366 B2 | 10/2010 | Rao et al. |
| 7,877,784 B2 | 1/2011 | Chow |
| 7,991,854 B2 | 8/2011 | Bahl |
| 8,087,082 B2 | 12/2011 | Bloch et al. |
| 8,108,555 B2 | 1/2012 | Awadallah et al. |
| 8,121,617 B1 | 2/2012 | LaGrotta et al. |
| 8,135,395 B2 | 3/2012 | Cassett et al. |
| D659,157 S | 5/2012 | Klein et al. |
| 8,195,196 B2 | 6/2012 | Haran et al. |
| D664,430 S | 7/2012 | Kelly et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| D671,132 S | 11/2012 | Woo |
| 8,346,860 B2 | 1/2013 | Berg et al. |
| 8,356,080 B2 | 1/2013 | Luna et al. |
| 8,364,785 B2 | 1/2013 | Plamondon |
| D677,688 S | 3/2013 | Woo |
| D680,131 S | 4/2013 | Anzures |
| 8,521,131 B1 | 8/2013 | Ramalingam et al. |
| 2004/0209608 A1 | 10/2004 | Kouznetsov et al. |
| 2005/0138450 A1 | 6/2005 | Hsieh |
| 2005/0186954 A1 | 8/2005 | Kenney |
| 2005/0221800 A1 | 10/2005 | Jackson et al. |
| 2006/0085357 A1 | 4/2006 | Pizarro |
| 2006/0212931 A1* | 9/2006 | Shull et al. .............. 726/10 |
| 2006/0217115 A1 | 9/2006 | Cassett et al. |
| 2006/0236325 A1 | 10/2006 | Rao et al. |
| 2007/0021112 A1 | 1/2007 | Byrne et al. |
| 2007/0038677 A1 | 2/2007 | Reasor et al. |
| 2007/0089165 A1 | 4/2007 | Wei et al. |
| 2007/0090954 A1 | 4/2007 | Mahaffey |
| 2007/0190995 A1 | 8/2007 | Wang et al. |
| 2007/0240127 A1 | 10/2007 | Tuvell et al. |
| 2008/0046369 A1 | 2/2008 | Wood |
| 2008/0047007 A1* | 2/2008 | Satkunanathan et al. ....... 726/22 |
| 2008/0049653 A1 | 2/2008 | Demirhan et al. |
| 2008/0086638 A1 | 4/2008 | Mather |
| 2008/0244407 A1 | 10/2008 | Eklund |
| 2008/0307243 A1 | 12/2008 | Lee |
| 2009/0006956 A1 | 1/2009 | Bae et al. |
| 2009/0064330 A1 | 3/2009 | Shraim |
| 2009/0119143 A1 | 5/2009 | Silver |
| 2009/0172227 A1 | 7/2009 | Taylor et al. |
| 2009/0205016 A1 | 8/2009 | Milas |
| 2009/0300511 A1 | 12/2009 | Behar et al. |
| 2010/0019731 A1 | 1/2010 | Connolly et al. |
| 2010/0097494 A1 | 4/2010 | Gum et al. |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0210240 A1 | 8/2010 | Mahaffey et al. |
| 2010/0240419 A1 | 9/2010 | Horino |
| 2010/0262924 A1 | 10/2010 | Kalu |
| 2010/0275127 A1 | 10/2010 | Morita et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Burgess et al. |
| 2011/0171923 A1 | 7/2011 | Daly et al. |
| 2011/0225492 A1 | 9/2011 | Boettcher et al. |
| 2011/0225505 A1 | 9/2011 | Uchida et al. |
| 2011/0241872 A1 | 10/2011 | Mahaffey |
| 2011/0289423 A1 | 11/2011 | Kim et al. |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0179801 A1 | 7/2012 | Luna et al. |
| 2012/0179814 A1 | 7/2012 | Swildens et al. |
| 2012/0185780 A1 | 7/2012 | Ma |
| 2012/0188064 A1 | 7/2012 | Mahaffey et al. |
| 2012/0196571 A1 | 8/2012 | Grkov et al. |
| 2012/0233695 A1 | 9/2012 | Mahaffey et al. |
| 2012/0259954 A1 | 10/2012 | McCarthy et al. |
| 2012/0303735 A1 | 11/2012 | Raciborski et al. |
| 2012/0317233 A1 | 12/2012 | Redpath |
| 2012/0324076 A1 | 12/2012 | Zerr et al. |
| 2012/0324094 A1 | 12/2012 | Wyatt et al. |
| 2012/0324568 A1 | 12/2012 | Wyatt et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |
| 2013/0055163 A1 | 2/2013 | Matas |
| 2013/0086682 A1 | 4/2013 | Mahaffey et al. |
| 2014/0331275 A1* | 11/2014 | Singh ............................ 726/1 |

OTHER PUBLICATIONS

"I'm Aza Raskin@aza. I make shiny things. I simplify.", "Vote! How to Detect the Social Sites Your Visitors Use", web page downloaded Nov. 4, 2013 from http://www.ararask.in/blog/post/socialhistoryjs, pp. 1-83.

"Preventing attacks on a user's history through CSS: visited selectors", "How CSS can be used to query a user's browser history", L. David Baron, Mozilla Corporation, web page downloaded Nov. 4, 2013 from http://dbaron.org/mozilla/visited-privacy, pp. 1-6.

Software Engineering Institute, Carnegie Mellon; "Securing Your Web Browser", Dormann et al., web page downloaded Nov. 4, 2013 from http://www.cert.org/tech_tips/securing_browser/, pp. 1-17.

Content Security Policy 1.0, "W3C Candidate Recommendation Nov. 15, 2012", web page downloaded Nov. 4, 2013 from http://www.w3.org/TR/CSP/, pp. 1-16.

PCT International Preliminary Report on Patentability for PCT/US2011/049182; Mailed on Mar. 7, 2013; pp. 1-9.

Non-Final Office Action dated Dec. 26, 2012 for U.S. Appl. No. 13/160,382, filed Jun. 14, 2011; pp. 1-23.

Sprite Mobile, Sprite Backup, Internet Archive, Way Back Machine, available at http://web.archive.org/web/20080903231803/http://www.spritesoftware.com/?page_id=280, 4 pages, Retrieved Jan. 16, 2013.

Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.

* cited by examiner

METHOD AND SYSTEM FOR EVALUATING SECURITY FOR AN INTERACTIVE SERVICE OPERATION BY A MOBILE DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION DATA

The present application is a continuation in part application of prior pending application Ser. No. 29/453,039 entitled Graphical User Interface for Notification Icon with Contextual Information Overlay, filed on Apr. 24, 2013; Ser. No. 29/453,040 entitled Graphical User Interface for Notification Icon with Contextual Information Overlay and Selection Bar, filed on Apr. 24, 2013; Ser. No. 29/453,047 Graphical User Interface for Notification Icon with Contextual Information Overlay and Security Icons, filed on Apr. 24, 2013; and, Ser. No. 29/453,048 entitled Graphical User Interface for Notification Icon with Contextual Information Overlay and Privacy Icons, filed on Apr. 24, 2013.

FIELD OF THE INVENTION

One or more embodiments relate generally to handheld electronic devices, and more specifically to systems and methods for evaluating security for performing an interactive service operation by a mobile communications device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Mobile electronic communications devices have evolved beyond simple telephones and are now highly complex multifunctional devices with capabilities rivaling, and in some cases surpassing, those of desktop or laptop computers. In addition to voice communications, many mobile communication devices are capable of capturing images, text messaging, e-mail communications, internet access, social networking, and running full-featured application software. A full range of mobile applications are available from online application stores that can be downloaded onto mobile communications devices. These applications can be games and/or services, such as data storage services, mapping services, and/or news services. Additionally, mobile communication devices can run web browsers which can access websites to perform interactive services. In addition, mobile communications devices can support applications that provide interactive services that involve sensitive information or which can perform various electronic transactions. For example, such interactive services can include financial services, such as online banking, stock trading, payments, and other online financial activities. Using these interactive services, a user can purchase merchandise online or at a store, transfer funds between bank accounts, and/or pay monthly bills anywhere any time via the user's mobile communications device. In addition, interactive services may include medical or health information services provided by, for example, a hospital's or doctor's server for scheduling medical appointments or viewing results of medical or diagnostic procedures.

While these interactive services offer tremendous conveniences, some users are reluctant to use them for fear of having their sensitive financial, medical, or other information stolen and used without their knowledge and/or authorization. Current anti-virus security applications running on mobile communications devices can detect suspicious applications on the device and can disable or remove such malware. These security applications, however, do not provide a comprehensive security assessment of the device's interactive services environment, of an application while the application is running and/or being used by the user, and/or of a website running in a web browser that provides an interactive service. Hence, the user's fear of revealing sensitive information in a perceived insecure environment is not addressed and therefore, even when the interactive services environment, the application and/or the websites are secure, the user will not utilize the application's financial or other capabilities.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
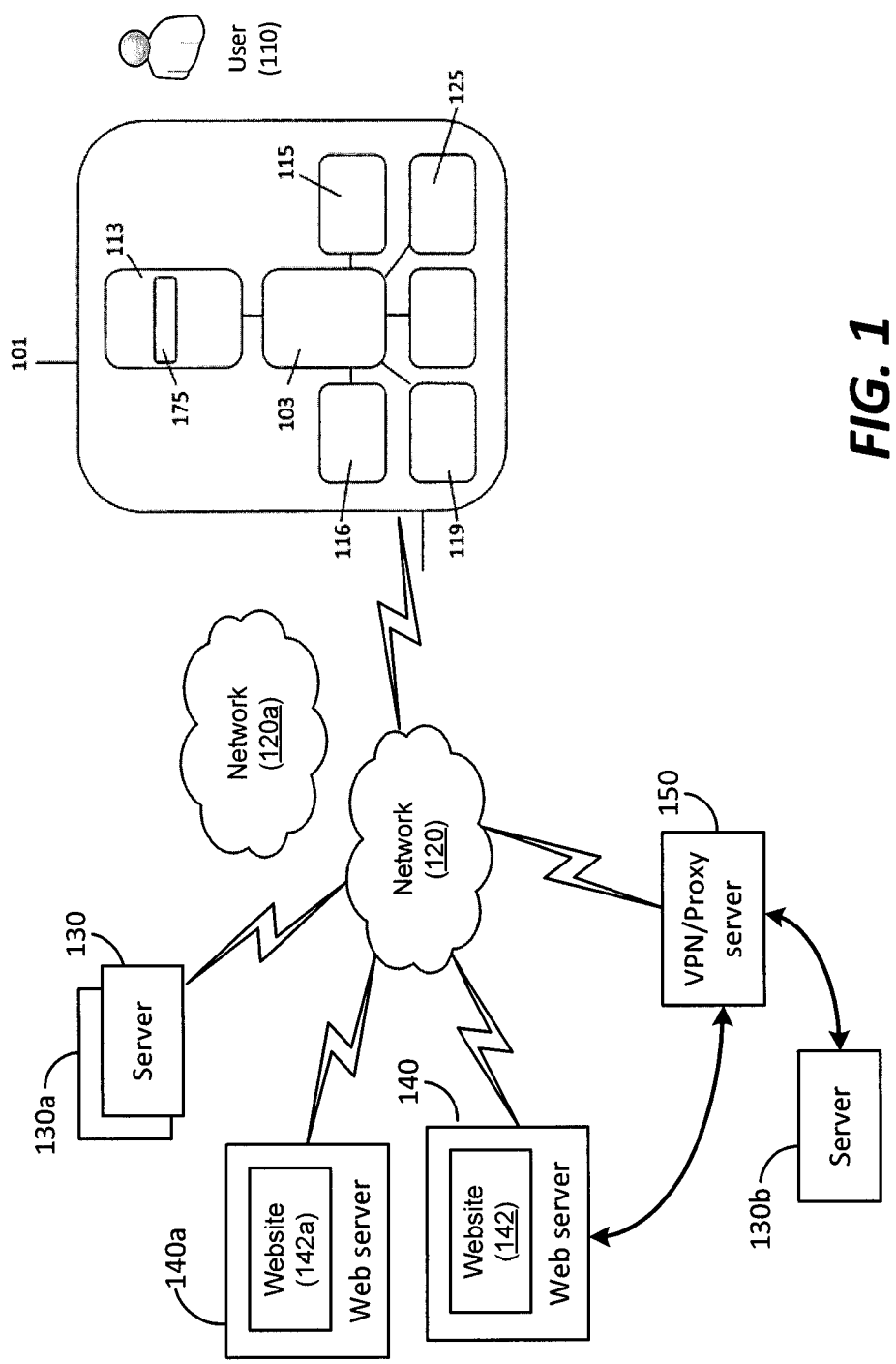
FIG. 1 is a block diagram illustrating a mobile communications device according to an embodiment.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

Systems and methods are provided for evaluating security during an interactive service operation by a mobile communications device that hosts applications including those used for financial transactions and those using sensitive user information. According to an embodiment, "interactive services" may comprise applications running on a mobile communications device that communicate with a website or other server, or a web application running in a web browser on a mobile communications device which communicates with a website to perform an interactive service operation for a user. At least some of the interactive services are configured to communicate with a web server or other server over a network during an interactive service operation. In an embodiment, when an interactive service is launched, the mobile communications device automatically generates a security evaluation for the launched interactive service based on several trust factors that can be related to a current state of the mobile communications device, to a security feature of the interactive service, and/or to a security feature of the network over which information is currently being transmitted or received. Once the evaluation is generated, an action based on the evaluation can be performed. For example, the action can be displaying the security evaluation to a user of the mobile communications device while the user is using the application.

In an embodiment, when the security evaluation indicates that the interactive service operation environment is safe and the interactive service is trusted, the user can have some assurance that the user's sensitive information is protected during an interactive service operation. Alternatively, when the security evaluation indicates that there are security concerns with the interactive service operation environment and/or the service, the user can terminate the interactive service operation and/or take measures to improve the security of the interactive service operation.

As used herein, the term "mobile communications device" refers to mobile phones, tablets, PDAs and smartphones. The term "mobile communications device" also refers to a class of laptop computers which run an operating system that is also used on mobile phones, tablets, PDAs, or smartphones. Such laptop computers are often designed to operate with a continuous connection to a cellular network or to the internet via a wireless link. Specifically, mobile communications devices include devices for which wireless communication services such as voice, messaging, data, or other wireless Internet capabilities are a primary function. As used herein, a "mobile communications device" may also be referred to as an "electronic device," an "electronic client device," "mobile device," "mobile client," or "handset." However, a person having skill in the art will appreciate that while the present invention is disclosed herein as being used on mobile communications devices, the present invention may also be used on other computing platforms, including desktop, laptop, notebook, netbook, or server computers.

Prior to describing the subject matter in detail, an exemplary mobile communications device in which the subject matter may be implemented shall first be described. Those of ordinary skill in the art will appreciate that the elements illustrated in FIG. 1 may vary depending on the system implementation. With reference to FIG. 1, a block diagram of an embodiment of the mobile communications device 101 is illustrated. The mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: BLUETOOTH, local area networks such as WI-FI, and cellular networks such as GSM, CDMA or LTE.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. Pat. No. 8,099,472, entitled "SYSTEM AND METHOD FOR A MOBILE CROSS-PLATFORM SOFTWARE SYSTEM." In another embodiment, the local software component 175 can be device, platform or operating system specific.

The mobile device 101 may operate in a networked environment using logical connections to one or more remote nodes 130, 140, 150 via a communication interface. The remote node may be another computer, a server, a router, a peer device or other common network node, and typically includes many or all of the elements described above relative to the mobile device 101. For example, the remote node can be a server 130 providing a storage service, a web server 140 that hosts one or more websites 142 and/or a VPN or proxy server 150 coupled to a server 130*b* and/or a web server 140. The communication interface may interface with a wireless network and/or a wired network. Examples of wireless networks include, for example, a BLUETOOTH network, a wireless personal area network, a wireless 802.11 local area network (LAN), a near field communication (NFC), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

It should be understood that the arrangement of mobile communication device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2A:
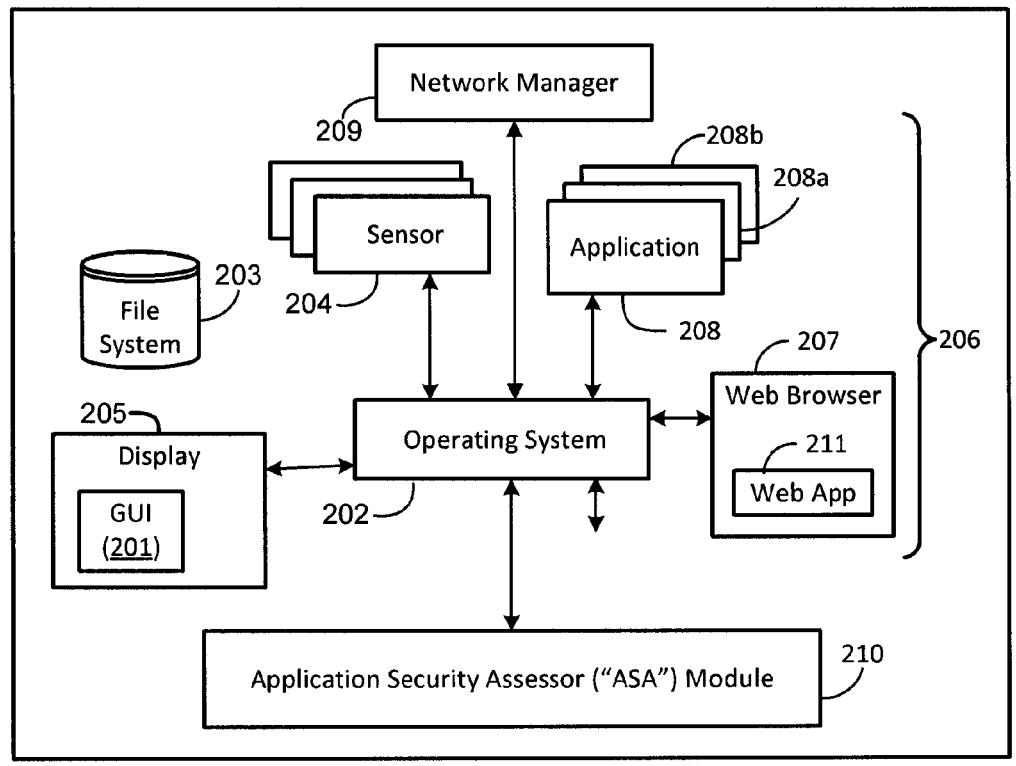
FIG. 2A is a block diagram illustrating a mobile communications device according to another embodiment.

FIG. 2A is a more detailed block diagram of a mobile communications device 200 having components, and/or their analogs, that are configured to evaluate security during an interactive service operation according to an embodiment. As is shown in FIG. 2A, the mobile communications device 200 can include an operating system 202, a display 205, a processor, interactive services 206, a network manager component 209, a file system 203 for storing application files and other files, and a plurality of sensors 204. In an embodiment, the display 205 can be configured to present visual content to a user 110 of the communications device 200 via a graphical user interface 207 associated with an application 208.

The sensors 204 can include an accelerometer, a biometric reader, a camera, a microphone, a geo-locator, e.g., a Global Positioning System (GPS), and other sensors 204. In an embodiment, each sensor 204 can collect sensor information specific to its sensor type. For example, the biometric reader can collect biometric information of the user 110 such as fingerprint and/or retina information. According to an embodiment, some sensors 204 can continuously collect sensor information, which can be provided, upon request, to an application 208 for further processing. Alternatively, other sensors 204 can be invoked on an as-needed basis to collect sensor information. For example, the biometric reader can be invoked to collect the finger print information of the user 110 during an authentication process. It should be understood that the sensors 204 can include sensors that reside within the mobile communications device 200 or which reside outside the device but are connected to it by a wired or wireless connection.

The interactive services 206 can include applications 208 configured to communicate with a server 130 or with a website 142 hosted by a web server 140 over a network 120, such as the Internet. For example, an application 208a associated with an entity, such as a bank, can be configured to transmit data to and receive data from a server 130a associated with the entity. Alternatively or in addition, interactive services 206 can include web applications 211 running in the web browser 207 and can be configured to communicate with a web server 140 hosting an associated website 142. For example, a web application 211 associated with the entity that runs in the web browser 207 can be an interactive service 206 that is configured to communicate with a target web site 142a associated with the entity to provide interactive services. In an embodiment, the application 208 or the web application 211 running in the browser 207 can interoperate with the network manager component 209, which can be configured to manage network connections between the mobile communications device 200 and one or more network enabled entities, such as the server 130, web servers 140, 140a, and/or proxy servers 150.

Figure 2B:
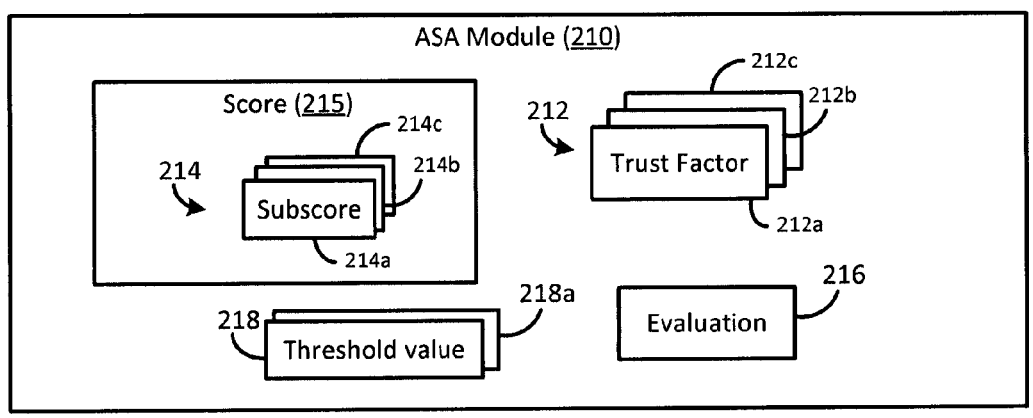
FIG. 2B is a block diagram illustrating an Application Security Assessor module according to an embodiment.

According to an embodiment, the mobile communications device 200 can be configured to provide an execution environment configured to support operation of an Application Security Assessor ("ASA") module 210. FIG. 2B is a more detailed block diagram representing the ASA module 210 according to an embodiment. The ASA module 210 can be configured, in an embodiment, to evaluate security aspects of the device's environment, and of an interactive service 206, e.g., an application 208 or a web application 211, while the service is running, and to determine whether it is safe to use the interactive service 206, e.g., the application or web application, to perform an interactive service operation. Based on this evaluation, the user can be informed that it is safe to use the interactive service or can be warned that it is not recommended to use the interactive service to perform the interactive service operation.

Figure 3:
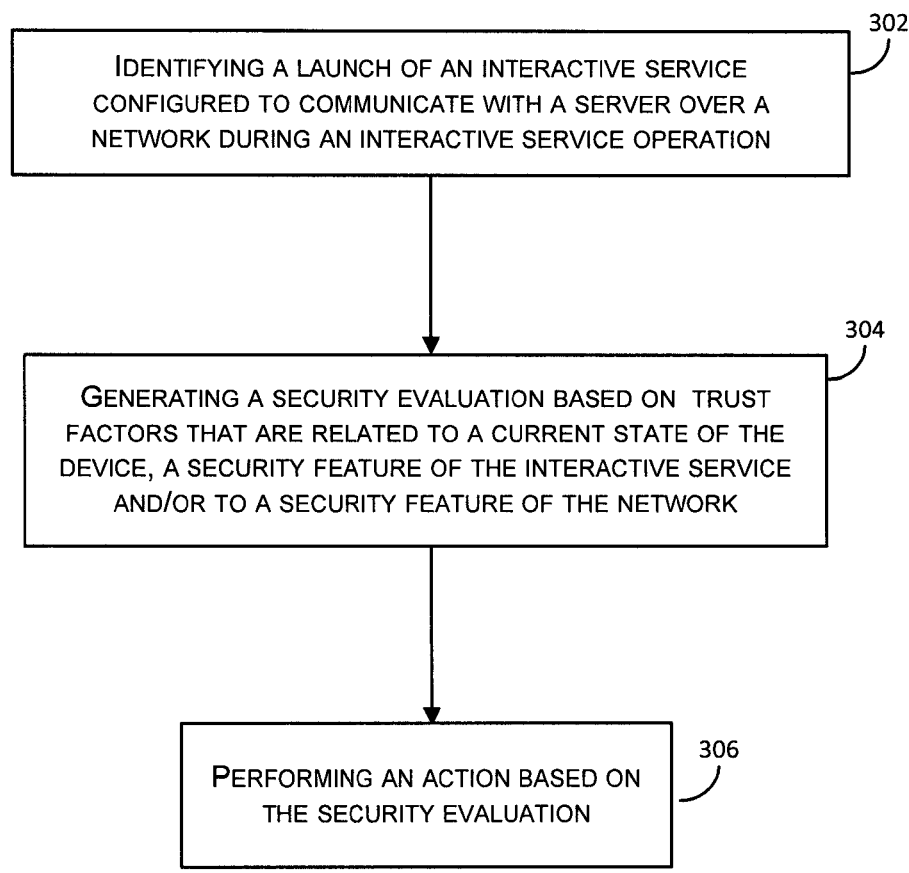
FIG. 3 is an operational flow diagram illustrating a high level overview of a method for evaluating security during an interactive service operation by a mobile communications device according to an embodiment.

FIG. 3 is a flow diagram illustrating a method for evaluating security during an interactive service operation by a mobile communications device according to an embodiment. The method illustrated in FIG. 3 can be carried out by, for example, at least some of the components in the example electronic device illustrated in FIG. 1, FIG. 2A, and FIG. 2B, but can also be carried out in environments other than those illustrated in FIG. 1, FIG. 2A and FIG. 2B. According to an embodiment, the method 300 begins, in block 302, when an interactive service configured to communicate with a server is identified or detected as being launched. As stated above, the interactive service 206 can be an application 208 that is associated with a particular entity, such as a financial institution, a payment service or an e-commerce service, and the application 208 can be configured to transmit data to and to receive data from a server 130a associated with the entity. Alternatively, the launched interactive service 206 can be a web application 211 running in the web browser 207 that is associated with a website 142 and that allows the user 110 to access content on the website 142.

Referring again to FIG. 3, when the interactive service 206 is launched, a security evaluation is generated based on a plurality of trust factors in block 304. In an embodiment, at least one of the trust factors 212 can be related to a current state of the mobile communications device 200, to a security feature of the interactive service 206, and/or to a security feature of the network 120 to and from which data is transmitted and received by the device 200. According to an embodiment, when the interactive service 206 is launched, the ASA module 210 can be automatically invoked to generate the security evaluation 216. In another embodiment, the ASA module 210 can be invoked by the user 110. For example, when an application is 208 is launched, the user can be asked whether a security check of the launched application 208 should be performed, and when the user responds affirmatively, the ASA module 210 can proceed to generate the security evaluation 216.

Alternatively or in addition, according to an embodiment, an administrator or the user can define for which application(s) or web site(s) the security evaluation 216 should be generated based on an application type, an application name, or web site URL. For example, in a settings or configuration mode, the applications 208 can be listed, by type and/or alphabetically, and the user can select for which application(s) the ASA module 210 should generate security evaluations 216. In another embodiment, the administrator or the user can indicate under what circumstances a security evaluation should be generated. For example, the user can configure the ASA module 210 to determine the security evaluation 216 for a launched application when the device 200 is located near a specified geo-location or when the application 208 is launched during a particular time period.

Alternatively or in addition, the administrator or the user can define when the security evaluation 216 should be generated based on information requested from the user or based on a type of user activity. For example, when a web application 211 running on the web browser 207 receives a request for the user's password or credit card number, the ASA module 210 can be invoked to generate the security evaluation 216. In other embodiments, the ASA module 210 can be configured to generate a security evaluation 216 based on other factors and/or a combination of circumstances and factors.

As noted above, the security evaluation 216 is generated based on a plurality of trust factors 212. In an embodiment, the trust factors 212 are related to factors affecting the security environment within and around the mobile communications device 200 and can be used to evaluate how safe it is to perform an interactive service operation using the launched interactive service 206 on the device 200. According to an embodiment, the plurality of trust factors 212 can be associated with a plurality of security subscores 214 so that each trust factor 212 can be evaluated and scored. It should be understood that alternative means of quantifying a security evaluation besides numeric scores, including letter grading ("A," "B", "C", "D", "F") or outputting a category or classification (e.g., "safe" or "unsafe" or "suspicious") can be used.

For instance, in an embodiment, a trust factor 212 can be related to the state of the mobile communications device 200 at the time the security evaluation 216 is generated, e.g., when the application 208 is launched or when sensitive user information is requested from a website 142. In an embodiment, for example, a trust factor 212a can be directed to whether the device 200 is protected by an anti-malware software application. Here, the ASA module 210 can determine the security subscore 214a associated with the trust factor 212a, in an embodiment, by searching the file system 203 for a known anti-malware application. When such an application is not found, the trust factor 212a is not satisfied and a security risk exists. In this case, the ASA module 210 can be configured to set the security subscore 214a to a value greater than zero, which signifies that a security risk exists. Otherwise, when the device 200 is protected by an anti-malware application, the security subscore can be set to zero.

Alternatively or in addition, another trust factor 212a related to the state of the mobile communications device 200 can be directed to whether suspicious programming code, i.e., malware, is detected on the device 200. In this case, the ASA module 210 can determine the security score, in an embodiment, by scanning the applications 208 on the device 200 to detect malware. The ASA module 210, for instance, can invoke an anti-malware software application, when one exists, to scan application files stored in the file system 203 and to identify malicious programming code and/or suspicious activity. When malware is detected, a security risk exists and the ASA module 210 can be configured to set the security subscore 214a to a value greater than zero. Otherwise, when the device 200 is malware-free, the security subscore 214a can be set to zero.

In another embodiment, yet another trust factor 212a related to the state of the mobile communications device 200 can be directed to whether the mobile communications device 200 is lost or stolen. Here, the security subscore 214a can be determined, in an embodiment, by transmitting a query to a service provider associated with the mobile communications device 200 to determine whether the device 200 has been reported as being lost or stolen. When the device 200 is lost or stolen, the ASA module 210 can be configured to set the security subscore 214a to a value greater than zero, and when the device 200 is not, the security subscore 214a can be set to zero. Other trust factors 212a related to the state of the mobile communications device 200 can be directed to identifying other open applications 208a, 208b and determining whether they pose a security threat; identifying the version, patch and/or patch-level of the operating system 202; and identifying other web applications 211 the web browser 207 may be accessing and determining whether those web applications 211 post a security threat.

In addition, a trust factor 212 can be related to a security feature of the launched interactive service 206. For instance, in an embodiment, such a trust factor 212b can be directed to whether an application 208 was downloaded from a trusted source and/or whether the launched application 208 is authentic or trusted. In this embodiment, the ASA module 210 can be configured to determine that the application 208 is trusted by verifying that its hash matches the hash of the known authentic application or that the signer of the application matches the signer of the known authentic application, and by ensuring that the source from which it was downloaded is on a whitelist of trusted sources and/or not on a blacklist of suspicious sources. In addition, a trust factor 212b can be directed to whether the application 208 is up-to-date, and the ASA module 210 can be configured to determine that the application 208 is up-to-date by querying the trusted source of the application 208 or by retrieving information about the latest version of the application from a server 130 that can obtain the information in real-time from the trusted source of the application 208 or that can store the information in cache from a prior request to provide such information.

In another embodiment, a trust factor 212b related to a security feature of the launched application 208 can be directed to whether the interactive service 206 encrypts data transmitted to a web site 142, e.g., using HTTPS. In addition, when the interactive service is a web application 211, a trust factor 212b can be directed to whether the application 211 is miming in a web browser 207 that is able to understand and support security policies defined by content providers. For example, Content Security Policy (CSP) (http://www.w3.org/TR/CSP/) can be used by content providers to inform a web browser from where content expects to be loaded, so that a web browser that supports CSP will only execute scripts loaded in source files received from those whitelisted domains, ignoring all other script. In addition, a trust factor 212b related to a security feature of the launched interactive service 206 can be directed to whether the service 206 stores sensitive and confidential user data on the mobile communications device 200 and if so, whether that data is accessible by other applications 208a, 208b running on the device 200. According to an embodiment, when at least one of these trust factors 212b is not satisfied, the respective security subscore(s) 214b can be set to a value greater zero. Alternatively or in addition, another trust factor 212b related to a security feature of the launched application 208 can be directed to whether there exists in the web application 211 an attempted exploit of a vulnerability of the browser or the mobile communications device. In such a case the ASA module 210 can notify the developer of the application 208 or the entity associated with the interactive service 206.

In an additional embodiment, a trust factor 212 can be related to a security feature of the network 120 over which the launched interactive service 206 sends and receives data. For instance, in an embodiment, such a trust factor 212c can be directed to whether the network 120 is a secure network. Here, the ASA module 210 can be configured to query the network manager component 209 to determine whether the network 120 to which the device 200 is connected is an open network or a private network requiring proper credentials. According to an embodiment, when such a trust factor 212c is not satisfied, a security risk exists, and therefore, the ASA module 210 can set the security subscore 214c to a value greater than zero.

According to an embodiment, when first 212a and second 212b trust factors are not satisfied, the security subscore 214a of the first trust factor 212a and the security subscore 214b of the second trust factor 212b can be set to different values greater than zero to reflect the difference in security risks posed by the different trust factors 212a, 212b. For example, when the first trust factor 212a is directed to whether the interactive service encrypts outgoing data and the second trust factor 212b is directed to whether the network 120 is secure, it may be deemed that sending unencrypted data may pose a greater security risk than being connected to an unsecured network. In that case, the value of the security subscore 214a of the first trust factor 212a can be greater than the second trust factor's security subscore value 214b to reflect this difference in security exposure. According to an embodiment, the subscore values 214 for the plurality of trust factors 212 can be defined by an administrator, a user, and/or by default.

Once the plurality of trust factors 212 have been evaluated and scored, the ASA module 210 can determine a security score 215, in an embodiment, by accumulating the security subscores 214 associated with the plurality of trust factors 212. According to an embodiment, the security evaluation 216 can be generated based on the security score 215. For example, when the security score 215 is greater than a threshold value 218, the ASA module 210 can be configured to generate a security evaluation 216 that indicates that it is not recommended to perform the interactive service operation. Conversely, when the security score 215 is at most equal to the threshold value 218, the generated security evaluation 216 can indicate that it is safe to perform the interactive service operation.

According to an embodiment, the threshold value 218 can be zero so that when any one of the trust factors 212 is not satisfied, the security evaluation 216 indicates that it is not recommended to proceed with the interactive service operation. In another embodiment, the threshold value 218 can be greater than zero so that it is possible for the security evaluation 216 to indicate that it is safe to proceed with the interactive service operation even though a trust factor 212 is not satisfied. In an embodiment, more than one threshold value 218, 218a greater than zero can be defined. In this embodiment, more than two security evaluations 216 can be generated thereby providing more nuanced guidance. For example, when the security score 215 is greater than a first threshold value 218 but less than a second threshold value 218a, the ASA module 210 can be configured to generate a security evaluation 216 that indicates that it is not absolutely safe to perform the interactive service operation, and to proceed with caution.

Referring again to FIG. 3, once the security evaluation 216 is generated, an action based on the security evaluation 216 is performed in block 306. For example, in an embodiment, the action performed can include terminating the interactive service operation when the security evaluation 216 indicates that it is not safe to perform the interactive service operation. Here, the ASA module 210 can direct the network manager component 209 to block data traffic from and to the interactive service 206 and/or can disable the interactive service 206. Alternatively, or in addition, in an embodiment, the action performed can include displaying the security evaluation 216 to the user of the mobile communications device 200 while the user is using the interactive service 206.

Figure 4A:
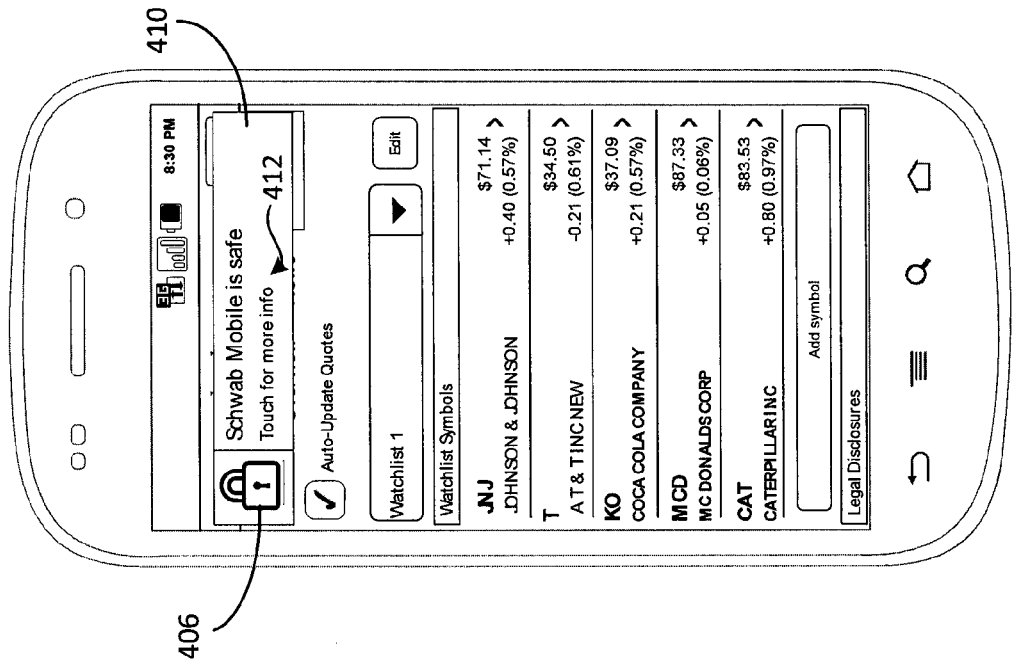
FIGS. 4A and 4B illustrate a mobile communications device displaying the security evaluation according to several embodiments.

FIG. 4A illustrates a mobile communications device displaying the security evaluation according to an embodiment. As is shown, the device 400 includes a display screen 402 that includes a notification bar 404 and a window for displaying a GUI associated with a launched application 208. In an embodiment, the security evaluation 216 can be a notification icon 406, such as a padlock, that is displayed in the notification bar 404. Unlike the typical web browser that displays a padlock icon to represent only the fact that the web browser has a secure connection to a website using the HTTPS protocol (over SSL or TLS); the notification icon 406 described herein represents the overall security assessment which includes a variety of additional trust factors. Additionally, the notification icon 406 is displayed in the mobile communication device's notification bar and not within the user interface 201 provided by the web browser.

In an embodiment, different security evaluations 216 can be represented by different types of notification icons or by differently colored notification icons 406. For instance, the notification icon 406 can be a red lock when the security evaluation 216 indicates that it is not recommended to proceed with the interactive service operation, a yellow lock when it is not absolutely safe to perform the interactive service operation, and to proceed with caution, or a green lock when it is safe to proceed with the interactive service operation.

Figure 4B:
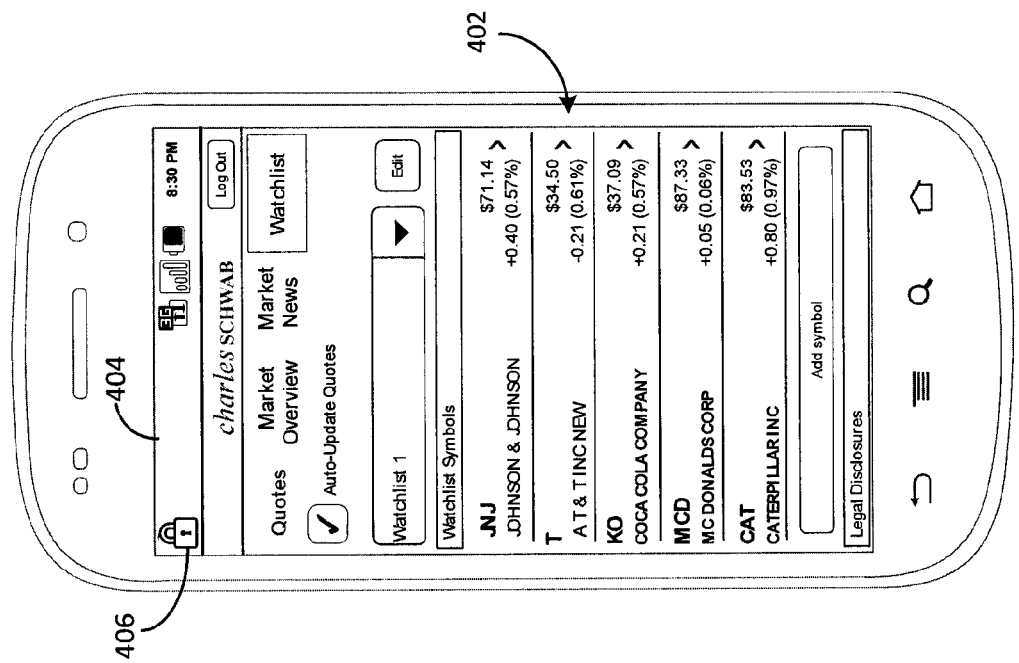

In another embodiment, shown in FIG. 4B, the security evaluation 216 can be displayed in a banner 410 that is superimposed over the GUI associated with the interactive service 206. In this embodiment, the banner 410 can include the notification icon 406 to provide a quick visual check and text 412 indicating that the application is safe.

Figure 5A:
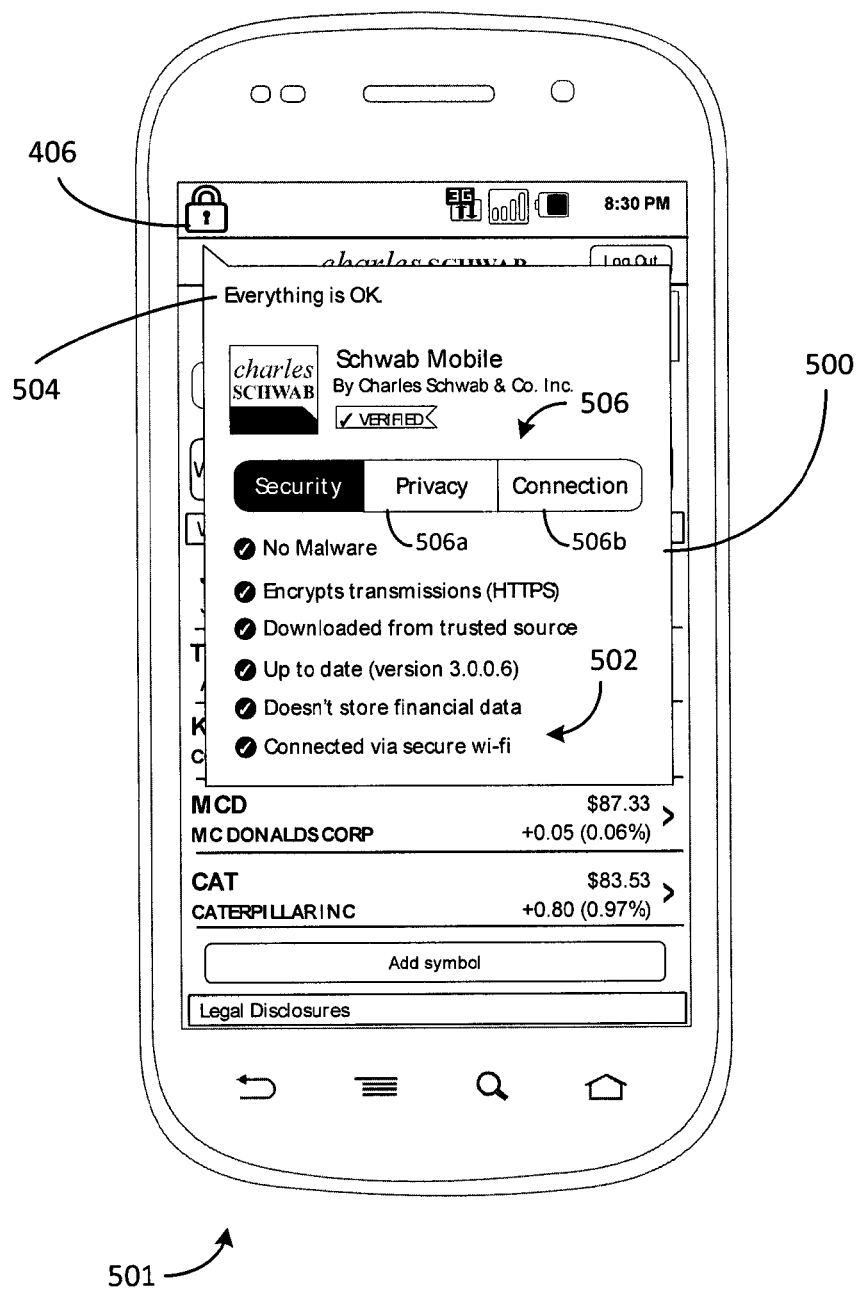
FIGS. 5A-5D illustrate a mobile communications device displaying a contextual information overlay and a security evaluation according to several embodiments.

According to an embodiment, additional contextual information relating to the security evaluation 216 can be displayed, for example, by selecting, e.g., touching, the banner 410. In an embodiment, the contextual information can be displayed in a contextual information overlay, which can be superimposed over the GUI associated with the interactive service 206 or presented in a separate window. FIGS. 5A-5D illustrate a mobile communications device displaying a contextual information overlay and a security evaluation according to an embodiment. As is shown in FIG. 5A, the contextual information overlay 500 is associated with the security evaluation 216, e.g., the notification icon 406, and provides contextual information relating to the security evaluation 216. In an embodiment, the overlay 500 can provide a summary 504 describing the security evaluation 216 and can include a checklist 502 that provides contextual information supporting the summary 504. For example, the checklist 502 can include information regarding a current security status of the mobile communications device 501, a security status of the launched interactive service 206, and/or to a security status of the network 120. Accordingly, in FIG. 5A, the summary 504 indicates "Everything is OK," and the checklist 502 confirms that indication. In contrast, in FIG. 5B, the summary 504a indicates "There is a problem," and the checklist 502a confirms this indication because the device 501a is connected via an unsecured network.

Figure 5B:
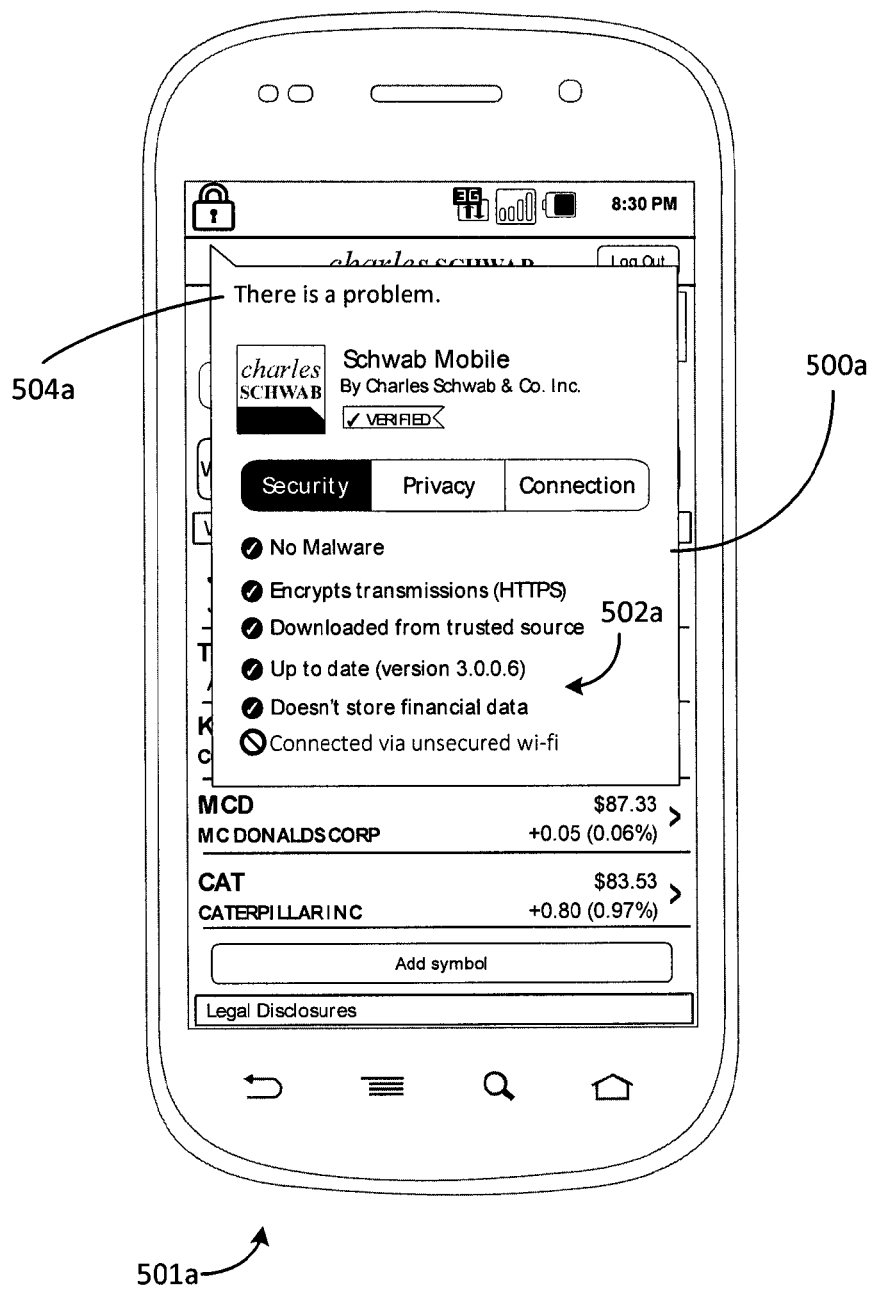
Figure 5C:
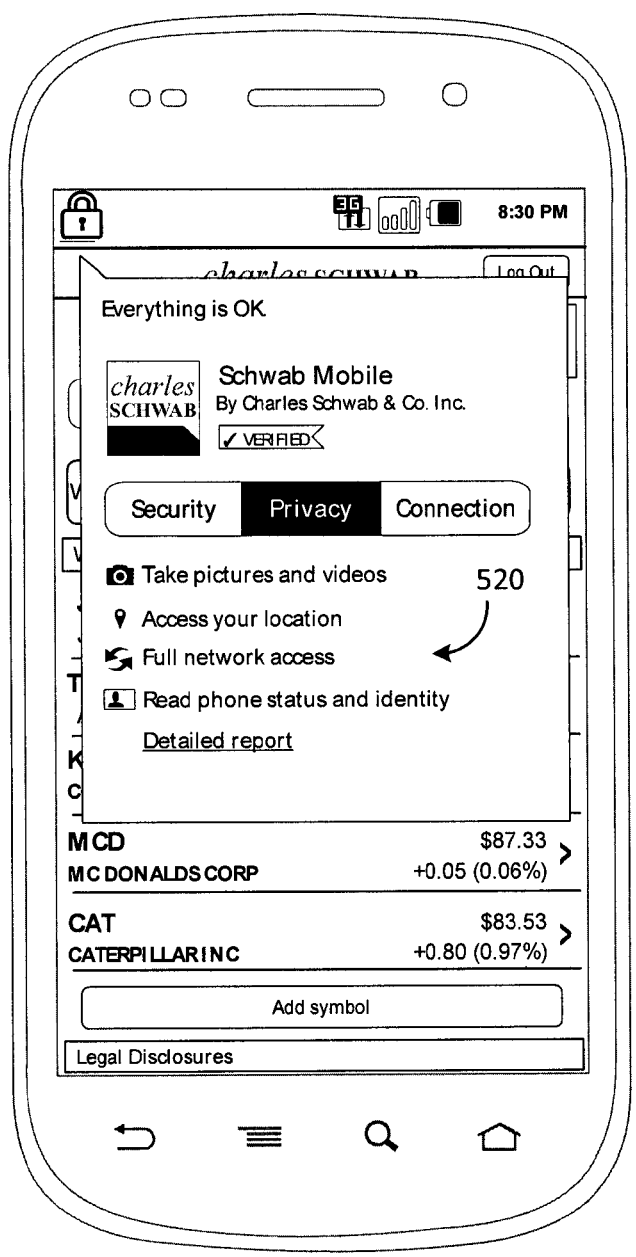
Figure 5D:
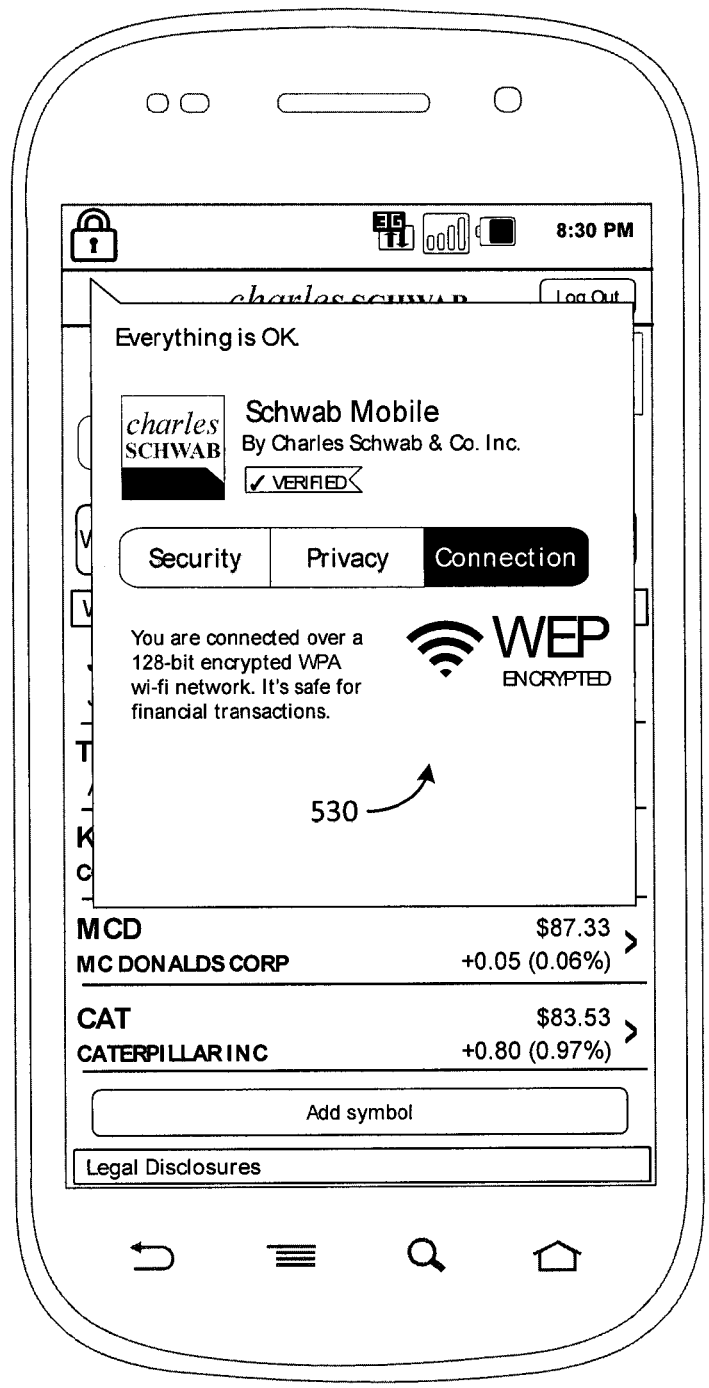

In FIG. 5A and FIG. 5B, the contextual information overlay 500, 500a provides contextual information relating specifically to security concerns. In another embodiment, contextual information relating specifically to privacy and connection concerns can also be displayed. The contextual information overlay 500 can include, in an embodiment, information navigation tabs 506 that provide access to privacy and connection information when selected. For example, when the privacy tab 506a is selected, privacy information 520 associated with the interactive service 206 is displayed, as shown in FIG. 5C, and when the connection tab 506b is selected, connection information 530 is displayed, as shown in FIG. 5D.

According to an embodiment, the ASA module 210 can be configured to perform additional security functions to enhance security and to ensure that the interactive service operation is performed in a safe environment. For instance, as indicated above, the launched interactive service 206 can be an application 208a or a web application 211 that is purportedly associated with a specific entity, such as a financial institution, and that is configured to transmit data to and to receive data from a target website 142a. In this case, in addition to generating the security evaluation 216 for the interactive service 206, the ASA module 210 can verify that the interactive service 206 is sending data to a website that is an authentic target website 142a associated with the specified entity and not a fraudulent website posing as the target website 142a. For example, in an embodiment, the ASA module 210 can examine a uniform resource location (URL) of the target website 142a to identify a domain. Once the domain is identified, the ASA module 210 can determine whether the domain is registered by the specified entity by querying a domain registrar. The interactive service can purport to be associated with a specific entity by using text or images associated with or identifying the name of the entity or its logo or trademarks, or by using the name of the entity or its trademarks within the URL domain or path, or text designed to be confusingly similar to the name of the entity or its trademarks. In such a case the ASA module 210 can notify the developer of the application 208 or the entity associated with the interactive service 206. In an embodiment, the ASA module 210 can redirect the web browser 207 to the legitimate website or web application 211 that is actually associated with the entity.

In addition, the ASA module 210 can check the characters of the URL to detect visually ambiguous substitutions, e.g., one (1) and the lowercase letter "L." Moreover, the ASA module 210 can examine the placement of certain phrases referring to the entity within the URL to detect a fraudulent website. For example, "online.com/Citibank" can be a URL for a website posing as an authentic website having a URL "Citibank.online.com." When the purported target website is a fraudulent website, the ASA module 210 can generate and display to the user a security warning indicating that the interactive service 206 is suspicious. In addition, the ASA module 210 can be configured to block the interactive service operation and to quarantine the interactive service 206 for further security analysis. In addition, the ASA module 210 can display one type of visual indicator or badge atop the display of the interactive service to indicate the level of trust or safety as determined by the ASA module. In such a case, the ASA module 210 can notify the developer of the application 208 or the entity associated with the interactive service 206.

In another embodiment, the ASA module 210 can be configured to take additional security measures when certain trust factors 212 are not satisfied. For instance, when the trust factor 212a is directed to whether the mobile communications device 200 is lost or stolen, and the security subscore 214a is set to a value greater than zero because the device is reported lost or stolen, the ASA module 210 can be configured to lock the mobile communication device 200 so that it is inoperable. In addition, when the launched interactive service 206 is one that accesses a target website 142a, the ASA module 210 can transmit a notification message to the target website 142a warning it that the device 200 is lost or stolen. In another embodiment, when the trust factor 212c directed to whether the network is a secure network is not satisfied, the ASA module 210 can be configured to invoke the network manager component 209 to detect another network 120a that is a secure network. When the secure network 120a is detected, the ASA module 210 can instruct the network manager component 209 to disconnect the device 200 from the unsecured network 120, and to connect to the secure network 120a. When the connection to the secure network 120a is established, the security subscore 214c associated with the trust factor 212c can be reset to zero.

According to an embodiment, in addition to generating the security evaluation 216 for the interactive service 206, the ASA module 210 can also authenticate the user of the mobile communications device 200 to ensure that the user is authorized to perform the interactive service operation. The user can be authenticated based on information known to the device's registered user in an embodiment. For example, the user can be asked to submit a password, to identify recently visited websites using the device 200, to confirm applications 208 installed on the device 200, and/or to identify favorite contacts stored on the device 200.

In another embodiment, the user can be authenticated based on a geo-location of the mobile communications device 200 and/or sensor data collected by the device 200. For example, the ASA Module 210 can be configured to identify the device's geo-location using the device's GPS sensor 204 and to compare the device's location to a known location of the user. When the device's location is near the user's known location, the user can be authenticated. In another embodiment, the ASA module 210 can collect the user's biometric information via the biometric reader sensor 204 and compare the collected information to stored biometric information to authenticate the user.

In another embodiment, the ASA module 210 can authenticate the user of the device 200 by determining that another mobile communications device known to be associated with the user is nearby. In this case, the ASA module 210 can transmit a request to the other mobile communications device via a short-range network, such as a BLUETOOTH or NFC network. When the ASA module 210 receives a response from the other mobile communications device, the user can be authenticated.

In addition to generating the security evaluation 216 and to implementing the additional security measures described above, the ASA module 210 can enhance the security during an interactive service operation by blocking access to certain internal resources by all applications 208 or web applications 211 during the interactive service operation and/or blocking communications with certain network locations. For example, during a interactive service operation, third party browser plugins and other components capable of intercepting the interactive service operation can be disabled, and access to network logs, process files, and web history can be blocked. Moreover, the ASA module 210 can close or suspend certain applications or all other applications during the interactive service operation.

Figure 2C:
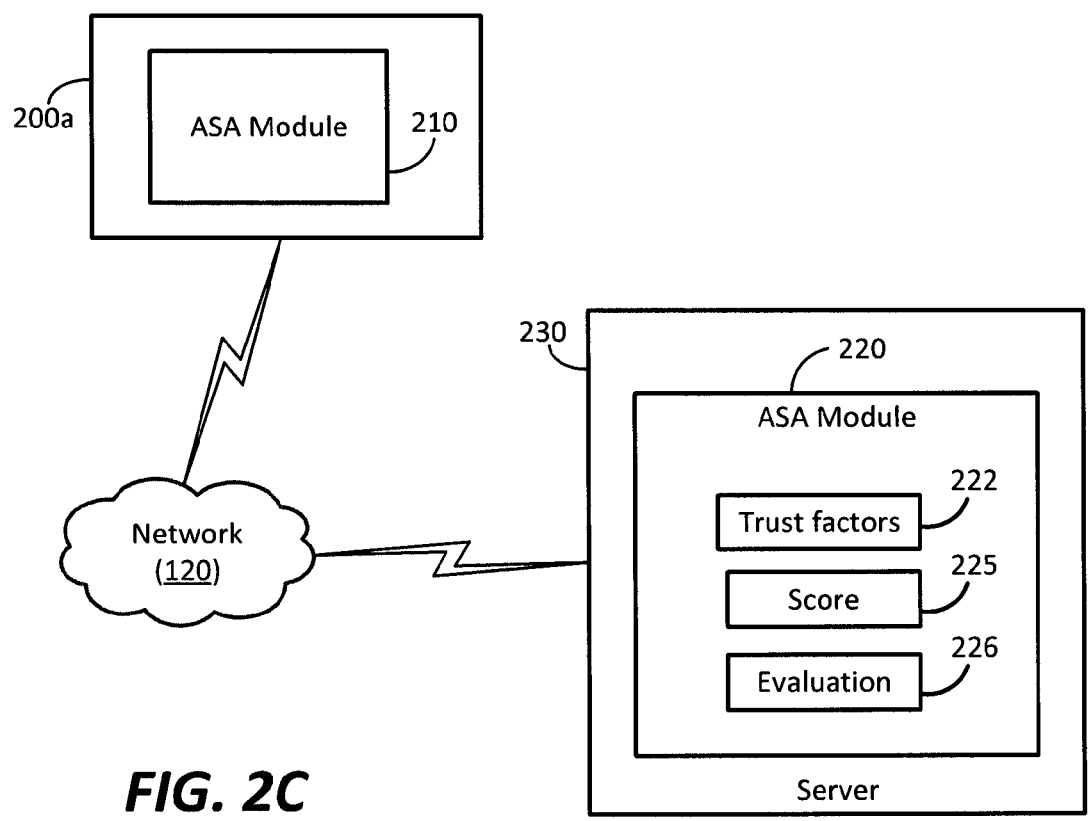
FIG. 2C is a block diagram illustrating a networked environment including a mobile communications device and a server according to an embodiment.

In the embodiments described and illustrated in FIG. 2A, the ASA module 210 is implemented on the mobile communications device 200. In another embodiment, the ASA module can also be implemented on a server, as shown in FIG. 2C. In this embodiment, the server 230 can be configured to host an ASA module 220 that is configured to perform at least some, if not all, of the tasks performed by the local ASA module 210 on the mobile communications device 200a.

For example, in an embodiment, the server's ASA module 220 can be configured to receive an indication from the mobile communications device 200a that an interactive service 206 has been launched, and in response, the ASA module 220 can be configured to generate a security evaluation 226 based on trust factors 222. In an embodiment, the trust factors 222 can be related to conditions described above. Alternatively, or in addition, the trust factors 222 can be related to other security concerns, such as a reputation of the interactive service 206. In this case, the reputation can be determined from social media and/or social networking web sites. In an embodiment, the action performed by the mobile communication device 200a can be based on either or both of the device's security evaluation 216 and the server's security evaluation 226.

In another embodiment, the server's ASA module 220 can receive the security subscores 214 of the device's trust factors 212 from the device 200a, determine a security score 225, and then return the security score 225 to the device 200a, which then generates the security evaluation 216. Alternatively, in another embodiment, the server's ASA module 220 can receive the security subscores 214, determine the security score 225, generate the security evaluation 226 based on the security score 225 and then return the evaluation 226 to the device 200a, which then performs the appropriate action. In yet another embodiment, the server's ASA module 220 can generate the security evaluation 226 based on the security score 225, determine the action that should be performed based on the evaluation 226, and perform the action and/or direct the device 200a to perform the action.

According to an embodiment, the server 230 can be a dedicated server that hosts a service configured to provide security services to a plurality of mobile communications devices 200. Alternatively, the server 230 can be an intermediary server that receives and transmits data between the device 200 and other servers 130 and/or web servers 140. In this case, the server 230 can be a VPN server 150, which tunnels communications between the device 101 and a server 130b, or it can be a configured proxy web server 150.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for evaluating security during an interactive service operation by a mobile communications device, the method comprising:
   identifying, by a security component on a mobile communications device, a launch of an interactive service configured to communicate with a server over a network during an interactive service operation, wherein the interactive service is associated with an entity and is configured to transmit data to and receive data from a target website purportedly associated with the entity;
   verifying that the target website is an authentic website associated with the entity, wherein the verifying includes identifying a domain of the target website based on a uniform resource locator (URL) of the target website and includes determining that the domain of the target website is registered by the entity;
   in response to the launch of the interactive service, generating, by the security component, a security evaluation of the interactive service based on a plurality of trust factors including: a trust factor related to a current state of the mobile communications device, a trust factor related to a security feature of the interactive service, and a trust factor related to a security feature of the network; and
   allowing, by the security component, the performance, by the mobile communications device, of the interactive service operation when a security measure from the security evaluation does not go beyond a threshold security measure.

2. The method of claim 1 further including displaying, by the mobile communications device, the security evaluation to a user of the mobile communications device while the user is using the interactive service.

3. The method of claim 1 wherein the security evaluation indicates that it is safe to perform the interactive service operation when the security measure does not go beyond the threshold security measure.

4. The method of claim 1 wherein the interactive service includes one or both of an application hosted by the mobile communications device and a web application operating in a web browser on the mobile communications device.

5. The method of claim 1 wherein when the target website is not an authentic website associated with the entity, the method further comprises generating, by the mobile communications device, a security warning indicating that the interactive service is suspicious, and displaying the security warning to the user.

6. The method of claim 1 wherein the entity is a financial institution, a payment service, or an e-commerce service.

7. The method of claim 1 wherein the plurality of trust factors are associated with a plurality of security subscores and the method further includes determining the security measure by accumulating the plurality of security subscores.

8. The method of claim 7 wherein the threshold security measure is a first threshold security score, and when the security measure is greater than the first threshold security score and less than a second threshold security score, the security evaluation indicates that it is not safe to perform the interactive service operation and to proceed with caution, and when the security measure is at least equal to the second threshold security score, the security evaluation indicates that it is not recommended to perform the interactive service operation.

9. The method of claim 7 wherein when a first trust factor is directed to whether malware exists on the mobile communications device, the method further includes setting a security subscore associated with the first trust factor to a value greater than zero when malware is detected, and setting the security subscore to zero when malware is not detected.

10. The method of claim 7 wherein when a first trust factor is related to a current state of the mobile communications device is directed to whether the mobile communications device is lost or stolen, the method includes setting the security subscore associated with the first trust factor to a value greater than zero when the device is reported lost or stolen.

11. The method of claim 10 wherein when the security subscore is greater than zero, the method further includes locking the mobile communications device and wherein when the interactive service is configured to access a target website, the method includes transmitting a notification message to the target website that the mobile communications device is lost or stolen.

12. The method of claim 7 wherein when a first trust factor related to a security feature of the interactive service is directed to whether the interactive service is downloaded from a trusted source, the method includes setting the security subscore associated with the first trust factor to a value greater than zero when the source is not a trusted source, and setting the security subscore to zero when the source is a trusted source.

13. The method of claim 7 wherein when a first trust factor related to a security feature of the interactive service is directed to whether the interactive service encrypts data transmitted to the website, the method includes setting the security subscore associated with the first trust factor to a value greater than zero when the data is not encrypted, and setting the security subscore to zero when the data is encrypted.

14. The method of claim 7 wherein when a first trust factor related to a security feature of the network is directed to whether the network over which data is transmitted and received is a secure network, the method includes setting the security subscore to a value greater than zero when the network is an insecure network, and setting the security subscore to zero when the network is secure.

15. The method of claim 14 wherein when the security subscore is greater than zero, the method further includes detecting a second network that is a secure network, disconnecting from the insecure network, connecting to the second network, and setting the security subscore to zero.

16. The method of claim 1 further comprising displaying, by the mobile communications device, a contextual information overlay associated with the security evaluation, wherein the contextual information overlay provides contextual information relating to the security evaluation.

17. The method of claim 16 wherein the contextual information overlay comprises a checklist that includes information regarding a current security status of the mobile communications device, a security status of the interactive service, and/or to a security status of the network.

18. The method of claim 1 further comprising authenticating, by the mobile communications device, the user of the mobile communications device based on information known to the device's user, a geo-location of the mobile communications device, and/or sensor data collected by the mobile communications device, wherein the interactive service operation is performed when the user is authenticated and when the security measure does not go beyond the threshold security measure.

19. The method of claim 18 wherein authenticating the user includes determining, by the mobile communications device, that the mobile communications device is near another mobile communications device known to be associated with the user.

20. The method of claim 1, wherein the interactive service operation is a first interactive service operation, the method further comprising:
  in response to an identified second interactive service operation using the interactive service, generating, by the mobile communications device, a second security evaluation of the interactive service based on the plurality of trust factors; and
  performing, by the mobile communications device, the second interactive service operation when a security measure based on the second security evaluation does not go beyond the threshold security measure.

21. A method for evaluating security during an interactive service operation by a mobile communications device, the method comprising:
  identifying, by a mobile communications device, a launch of an interactive service configured to communicate with a server over a network during an interactive service operation, wherein the interactive service is associated with an entity and is configured to transmit data to and receive data from a target website purportedly associated with the entity;
  verifying that the target website is an authentic website associated with the entity, wherein the verifying includes identifying a domain of the target website based on a uniform resource locator (URL) of the target website and includes determining that the domain of the target website is registered by the entity;
  in response to the launch of the interactive service, determining, by the mobile communications device, a security score for the interactive service based on a plurality of trust factors including: a trust factor related to a current state of the mobile communications device, a trust factor related to a security feature of the interactive service, and a trust factor related to a security feature of the network;
  generating a security evaluation for the interactive service based on the security score; and
  displaying, by the mobile communications device, the security evaluation for the interactive service and/or a contextual information overlay associated with the interactive service comprising a checklist that includes information regarding a current security status of the mobile communications device, a security status of the interactive service, and a security status of the network, wherein the security evaluation and/or the contextual information overlay is displayed while the user is using the interactive service.

22. A method for evaluating security during an interactive service operation by a mobile communications device, the method comprising:
receiving, by a server having a hardware processor and non-transient computer readable media, an indication from a mobile communications device that an interactive service on the mobile communications device is launched, wherein the interactive service is configured to communicate with another server over a network during an interactive service operation, and wherein the interactive service is associated with an entity and is configured to transmit data to and receive data from a target website purportedly associated with the entity;
verifying that the target website is an authentic website associated with the entity, wherein the verifying includes identifying a domain of the target website based on a uniform resource locator (URL) of the target website and includes determining that the domain of the target website is registered by the entity; and
in response to the indication of the launch of the interactive service, generating, by the server, a security evaluation of the interactive service based on a plurality of trust factors including: a trust factor related to a current state of the mobile communications device, a trust factor related to a security feature of the interactive service, and a trust factor related to a security feature of the network.

23. The method of claim 22 further comprising determining, by the server, an action based on the security evaluation, wherein the action is performed by the server and/or the mobile communications device.

24. The method of claim 22 further comprising transmitting the security evaluation to the mobile communications device, wherein the mobile communications device is configured to perform an action based on the security evaluation.

25. The method of claim 22 wherein the plurality of trust factors includes a trust factor related to a reputation of the launched interactive service and the method further includes determining, by the server, the interactive service's reputation from at least one of a social media and social networking web site.

26. The method of claim 22 wherein the server is one of a VPN server that is configured to tunnel data traffic between the mobile communications device and the other server and a proxy web server.

* * * * *